United States Patent [19]

Brewer

[11] Patent Number: 4,598,543
[45] Date of Patent: Jul. 8, 1986

[54] VARIABLE CYCLE ENGINE FOR HIGH ALTITUDE AIRCRAFT

[75] Inventor: G. Daniel Brewer, Burbank, Calif.

[73] Assignee: The United States of America as represented by the Secretary of the Air Force, Washington, D.C.

[21] Appl. No.: 698,720

[22] Filed: Feb. 6, 1985

[51] Int. Cl.⁴ ............................................. F02G 1/00
[52] U.S. Cl. ............................... 60/39.161; 60/39.33; 137/625.48
[58] Field of Search ............... 60/39.33, 39.161, 225, 60/263; 137/625.48, 625.68, 874

[56] References Cited

U.S. PATENT DOCUMENTS

| | | |
|---|---|---|
| 690,611 | 1/1902 | Roake .......................... 137/625.48 |
| 2,307,654 | 1/1943 | Andrews . |
| 2,474,143 | 6/1949 | Forsyth . |
| 2,580,591 | 1/1952 | Pouit . |
| 2,587,649 | 3/1952 | Pope . |
| 2,832,192 | 4/1958 | Budish . |
| 3,161,018 | 12/1964 | Sandre . |
| 3,520,138 | 7/1970 | Fox ................................. 60/39.161 |
| 3,678,690 | 7/1972 | Shohet et al. . |
| 3,810,360 | 5/1974 | Leibach ............................ 60/39.33 |
| 3,867,813 | 2/1975 | Leibach ............................ 60/39.33 |
| 3,893,638 | 7/1975 | Kelley ................................ 60/225 |

FOREIGN PATENT DOCUMENTS

| | | | |
|---|---|---|---|
| 959817 | 12/1974 | Canada .......................... 137/625.48 |
| 816942 | 7/1959 | United Kingdom ........... 137/625.48 |

OTHER PUBLICATIONS

Jane's Aircraft, pp. 341-342.

*Primary Examiner*—Louis J. Casaregola
*Assistant Examiner*—Donald E. Stout
*Attorney, Agent, or Firm*—Donald J. Singer; Stanton E. Collier

[57] ABSTRACT

A turboshaft engine is modified to be able to operate as a turbojet or a turboprop by the movement of an annular slide valve that directs gas flow between a high pressure turbine and a low pressure turbine.

1 Claim, 6 Drawing Figures

VARIABLE CYCLE ENGINE FOR HIGH ALTITUDE AIRCRAFT

STATEMENT OF GOVERNMENT INTEREST

The invention described herein may be manufactured and used by or for the Government for governmental purposes without the payment of any royalty thereon

BACKGROUND OF THE INVENTION

This invention relates generally to aircraft, and, in particular, relates to engines for high altitude and long duration flight aircraft.

Aircraft capable of flying at very high altitudes such as at about 100,000 feet for extended periods of time such as 24 hours can perform many important missions such as communications/data relay, ELINT-/COMINT, Airborne Early Warning, Tactical reconnaissance, surveillance, airborne targeting, battle damage assessment, defensive countermeasures, and ballistic/cruise missile defense support.

Some of the aircraft performing some of these missions are the U-2, TR-1, and the SR-71 aircraft although the flights are much shorter than 24 hours. The U-2 is a subsonic high altitude, long duration flight aircraft but its use is limited by payload package weight and by being manned. As presently configured, the U-2 is not equipped to perform a mission of 24 hours or greater. Even if the U-2 could maintain station for such a period the presence of a human may actually limit mission capability.

The primary missions envisioned for this class of aircraft are to be performed automatically with little or no intervention by the pilot. The pilot, then, is essentially superfluous for the nominal, nonemergency mission. A common rationale for the presence of a pilot is the human capability for dealing with unforeseen situations. It is believed that the high-altitude missions inherently present much less opportunity for application of this ability than do other military situations. High altitude makes surprise attack unlikely since any attacker must approach from below and can be as easily monitored electronically as can the condition of on-board equipment.

For a mission of 24 hours duration, several problems could arise in the performance of the pilot, assuming he is the sole occupant of the aircraft. Clinical studies done on sleep deprivation show that subjects kept awake show behavior problems ranging from accounts of irritability, inattention, uncooperativeness, and episodic rage. None of these characteristics is acceptable during a flight of a sensitive nature and can easily result in interruption of the mission, or worse.

Other studies show that pilot performance can be maintained at acceptable levels for 24-hour periods using alternating sleeping/waking periods. An auto-surveillance system would command the pilot's attention in event of emergency. The question is why the pilot so alerted has to be in the cockpit rather than at a console on the ground. Also, if airplane endurance were extended beyond 24 hours, which may be desirable and feasible, pilot physical limits on the overall system become severe.

Another consideration is that some high-risk missions could be undertaken by the unpiloted aircraft on which a commander would hesitate to commit a pilot. A policy of minimizing exposure of humans to potentially lethal situations is desired.

SUMMARY OF THE INVENTION

The present invention sets forth a device for use in a variable cycle engine that is used in a very high altitude aircraft that overcomes past problems associated with such an aircraft.

It is advantageous for subsonic, very high altitude (VHA) aircraft to use large diameter propellers. Normally, the most effective propellers are so large in diameter they would require either very long, heavy landing gear, or a high pylon mount for the engine/propeller which would be both heavy and the source of considerable drag, in order to provide adequate ground clearance for the propeller tips during takeoff and landing.

The present invention involves the use of a turboshaft engine that is equipped with a valve such that the engine can operate selectively to provide either jet thrust or shaft power to drive a propeller of whatever diameter is best suited to the purposes of VHA aircraft. For takeoff and landing the two-bladed propeller would be stowed in a horizontal position, feathered to minimize drag, and jet thrust would provide the means of powering the aircraft. To provide for flight above a selected minimum altitude, e.g., 2000 feet, the valve would be actuated to deliver power to the propeller shaft so this more efficient means of propulsion can be used for climb and cruise at altitude. This would eliminate the need for either exceptionally long landing gear or a high pylon mount for the engine/propeller.

The turboshaft engine to provide either jet thrust or shaft power, on a demand basis, has therein a valve, e.g., an annular slide valve serving to divert the exhaust from the high pressure turbine stage either radially outward and aft through a suitably contoured nozzle section to provide forward thrust for the aircraft; or, by sliding the annular slide valve forward, it will cut off the flow of the exhaust through the jet nozzles and instead, cause it to flow through the low pressure turbine section thus providing torque for the propeller shaft.

It is therefore one object of the present invention to provide for a means of powering a very high altitude aircraft for both takeoff/landing and for climbing/cruise at altitude.

It is another object of the present invention to provide for a variable cycle engine useable on very high altitude aircraft.

It is another object of the present invention to provide for a turboshaft engine that can be operated as a turbojet and/or turboprop with a sliding annular valve means therein.

It is another object of the present invention to provide for a method of use of a variable cycle engine in a very high altitude aircraft.

These and many other objects and advantages of the present invention will be readily apparent to one skilled in the pertinent art from the following detailed description of a preferred embodiment of the invention and the related drawings.

DETAILED DESCRIPTION OF THE PREFERRED EMBODIMENT

Figure 1:
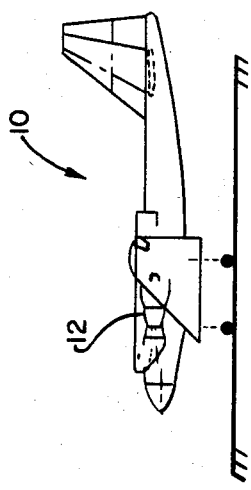
FIG. 1 is a side view of a very high altitude aircraft having the invention therein.
Figure 2:
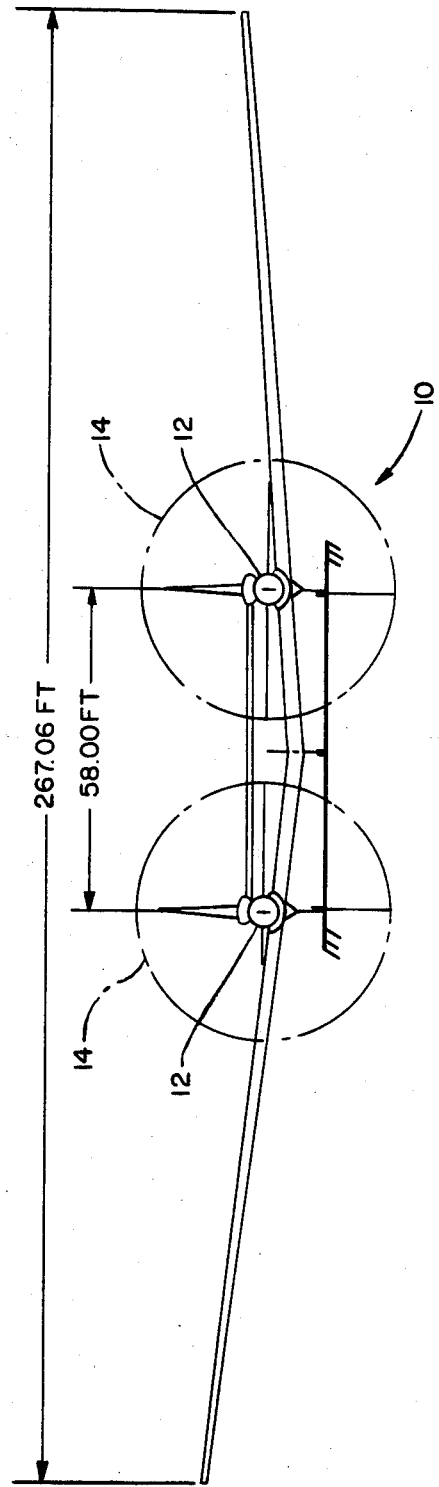
FIG. 2 is a front view of the very high altitude aircraft having the invention therein.

Referring to FIGS. 1 and 2, a very high altitude aircraft 10 is shown having thereon a pair of variable cycle engines 12. Aircraft 10 is to be unmanned, preferably, because of a flight requirement of about 24 hours and to save weight for the payload.

The optimum power train configuration based upon low specific fuel consumption and low propulsion system weight for a cruise mission at about 100,000 feet for 24 hours is variable cycle engine 12 being a modified turboshaft engine to be described hereinbelow, a composite propeller 14 of approximately fifty feet in diameter, and a fuel such as liquid hydrogen.

Figure 3:
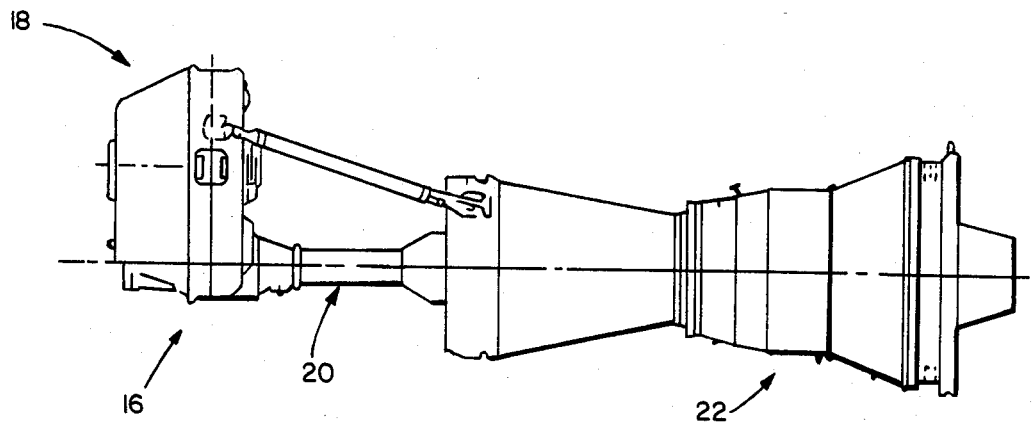
FIG. 3 is a side view of a turboprop engine.

A turboshaft engine 16 is shown in FIG. 3 showing a gearbox 18, shaft 20, and an engine 22.

Because propeller 14 is of such a large diameter, about 50 feet, engine 22 must operate in two separate modes, one as a turbojet with propeller 14 locked in the horizontal position and the other as a turboshaft. During takeoff and landing, engine 22 is operated in the turbojet mode and shortly after takeoff, engine 22 changes to the turboshaft mode for climb and cruise.

Figure 4:
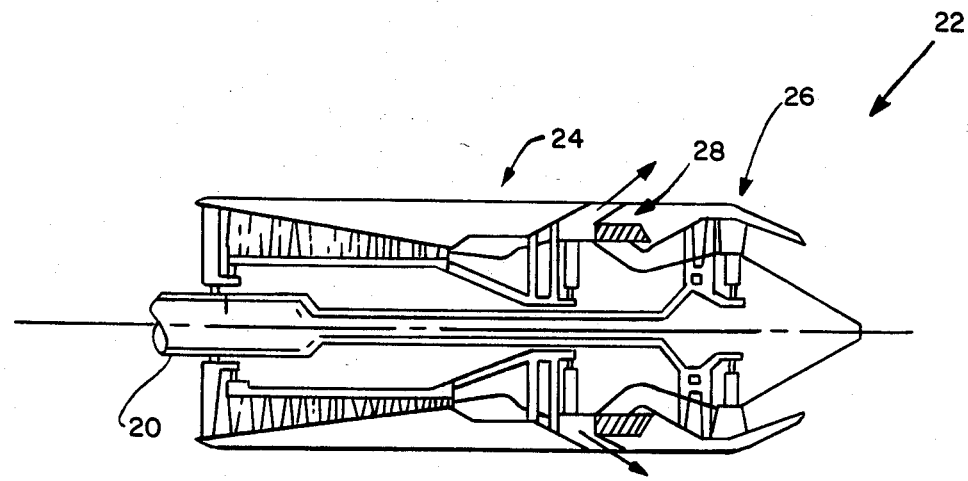
FIG. 4 is a cross section of an engine being convertible between a turboprop and turbojet with the invention therein.
Figure 5:
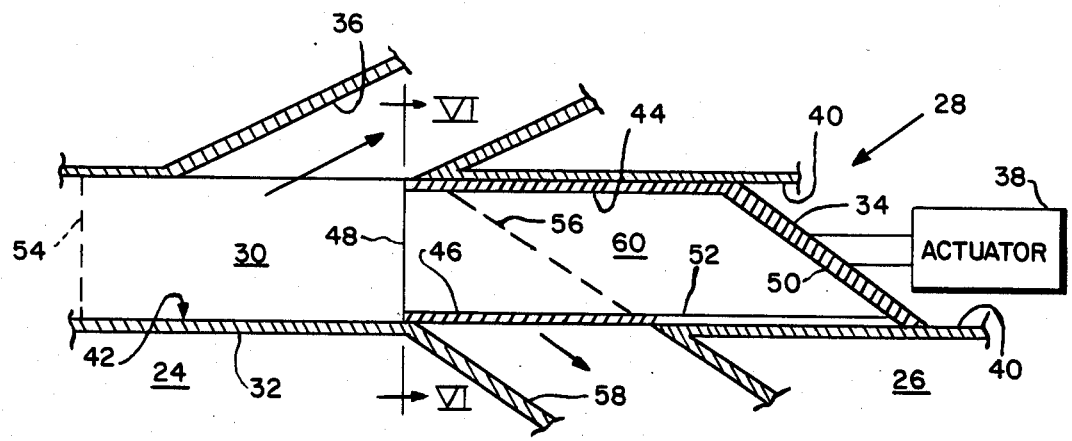
FIG. 5 is a partial cross section of a sliding annular valve for use with the present invention.

FIG. 4 shows a partial cross section of engine 22 having a high pressure turbine section 24 and a low pressure turbine section 26 for driving shaft 20 selectively. The flow of high pressure gas between sections 24 and 26 is controlled by an annular slide valve 28. Annular slide valve 28 is further detailed in FIG. 5 which is a further partial cross section of engine 22. In FIG. 5, high pressure gas 30 enters a diverting chamber 32 from high pressure turbine section 24. In the turbojet mode, as shown, gas 30 is blocked from entering low pressure turbine section 26 by annular valve 34 and as a result, gas 30 leaves chamber 30 by means of jet flow passages 36 located about the circumference of engine 22. The flow of gas 30 in passage 36 is controlled in a conventional manner thereafter for exhausting. Annular valve 34 moved by means of a conventional actuator 38 slides within valve walls 40 and partially into diverting chamber 32. Chamber walls 42 of chamber 32 also guide valve 34 while therein. Valve 34 has an annular outer wall 44, annular inner wall 46, an internal support wall 48, and a rear deflector wall 50 integrally formed as a unit. At the rear of annular inner wall 46, and between internal support walls 48 a gas exit port 52 is formed therein and allows gas 30 to pass therethrough when valve 34 is translated into a forward position by actuator 38 as identified by dotted lines 54 and 56. After gas 30 leaves port 52 gas 30 enters low pressure turbine section 26 having initially a prop flow passage 58. Gas 30 in section 26 turns a turbine connected to shaft 20 that drives a gearbox 18.

Figure 6:
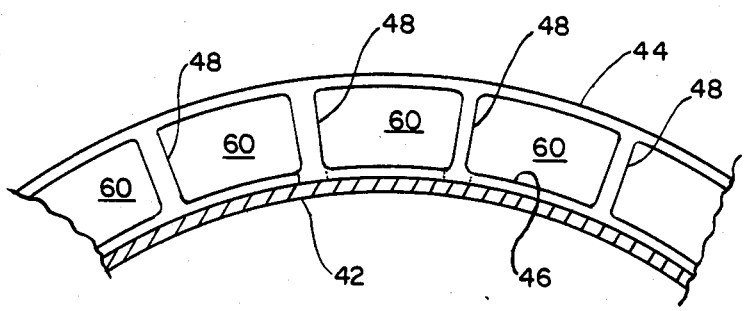

FIG. 6 shows a partial cross section of annular valve 34. FIG. 6 illustrates clearly a plurality of support walls 48 between annular outer wall 44 and annular inner wall 46. These walls 44, 46, and 48 form a plurality of valve passages 60.

It is clearly understood that annular slide valve 34 is made of a material sufficiently strong and heat resistant to operate within a turbine engine 22 and further that the exact positioning of elements is only shown pictorially.

Clearly, many modifications and variations of the present invention are possible in light of the above teachings and it is therefore understood, that within the inventive scope of the inventive concept, the invention may be practiced otherwise than specifically claimed.

What is claimed is:

1. A propulsion system for a very high altitude aircraft, said system comprising:

a propeller having a diameter of about 50 feet, and a variable cycle engine using a lightweight fuel for selectively driving said propeller, said variable cycle engine being able to operate in a turbojet mode and a turboprop mode, said variable cycle engine having gear means connected between said propeller and a turboshaft engine, said turboshaft engine having a high pressure turbine section, a low pressure turbine section, and an annular slide valve between said high pressure and said low pressure turbine sections, said slide valve in a first position causing said variable cycle engine to operate as a turbojet and in a second position to operate as a turboprop, said slide valve directing high pressure gas to either a jet flow passage or a prop flow passage upon translation by an actuator, said slide valve translating in an axial manner, said slide valve having a plurality of valve passages located circumferentially about said turboshaft engine, said slide valve comprising:

an annular outer ring;

an annular inner ring spaced radially inward from said outer ring;

a plurality of support walls between said outer and said inner rings;

a back wall attached to said outer ring, said inner ring, and said support structures; and said outer ring, said inner ring, and said back wall integrally forming a plurality of valve passages whereby gas entering a front port can exit through a rear port formed in each of said valve passages, said back wall being inclined at an incline being congruent with a rear wall of a prop flow passage in said low pressure turbine section.

* * * * *